(12) United States Patent
Kiyama

(10) Patent No.: US 8,437,064 B2
(45) Date of Patent: May 7, 2013

(54) OPTICAL SCANNING APPARATUS

(75) Inventor: Kota Kiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 12/477,893

(22) Filed: Jun. 3, 2009

(65) Prior Publication Data
US 2009/0303561 A1 Dec. 10, 2009

(30) Foreign Application Priority Data

Jun. 6, 2008 (JP) ................... 2008-149761

(51) Int. Cl.
G02B 26/08 (2006.01)
(52) U.S. Cl.
USPC ....................................... 359/216.1
(58) Field of Classification Search ..... 359/212.1–221.1
See application file for complete search history.

(56) References Cited

U.S. PATENT DOCUMENTS

| | | | | |
|---|---|---|---|---|
| 4,975,626 A | 12/1990 | Yagi et al. | ...................... | 318/567 |
| 5,808,431 A | 9/1998 | Koyama et al. | ............... | 318/278 |
| 6,400,384 B1 * | 6/2002 | Kuwabara | ..................... | 347/129 |
| 6,870,559 B2 | 3/2005 | Kanno | ........................... | 347/250 |
| 2003/0214572 A1 | 11/2003 | Kanno | ........................... | 347/259 |
| 2005/0200930 A1 * | 9/2005 | Kanno | ........................... | 359/212 |
| 2007/0206234 A1 * | 9/2007 | Ozasa et al. | .................. | 358/471 |

FOREIGN PATENT DOCUMENTS

| | | |
|---|---|---|
| JP | 2-016523 | 1/1990 |
| JP | 2-019820 | 1/1990 |
| JP | 11-291544 | 10/1999 |
| JP | 2000-338442 | 12/2000 |
| JP | 2003-295097 | 10/2003 |
| JP | 2003-295098 | 10/2003 |
| JP | 3526136 B | 5/2004 |
| JP | 2004-209882 | 7/2004 |
| JP | 2006-201462 | 8/2006 |
| JP | 2007-185787 | 7/2007 |

* cited by examiner

Primary Examiner — Jennifer L. Doak
(74) Attorney, Agent, or Firm — Fitzpatrick, Cella, Harper & Scinto

(57) ABSTRACT

An optical scanning apparatus includes a light source which emits an optical beam, a deflection scanning unit, and a control unit. The deflection scanning unit includes a rotating polygonal mirror which deflection-scans the optical beam emitted from the light source so that the optical beam will scan an object to be scanned, and a drive unit which rotationally drives the rotating polygonal mirror. The control unit controls the rotational speed of the rotating polygonal mirror by accelerating or decelerating the drive unit at a predetermined time during one rotation of the rotating polygonal mirror. The predetermined time is a time when a deviation in length of a scanning line formed by each reflecting surface of the rotating polygonal mirror becomes relatively small.

13 Claims, 16 Drawing Sheets

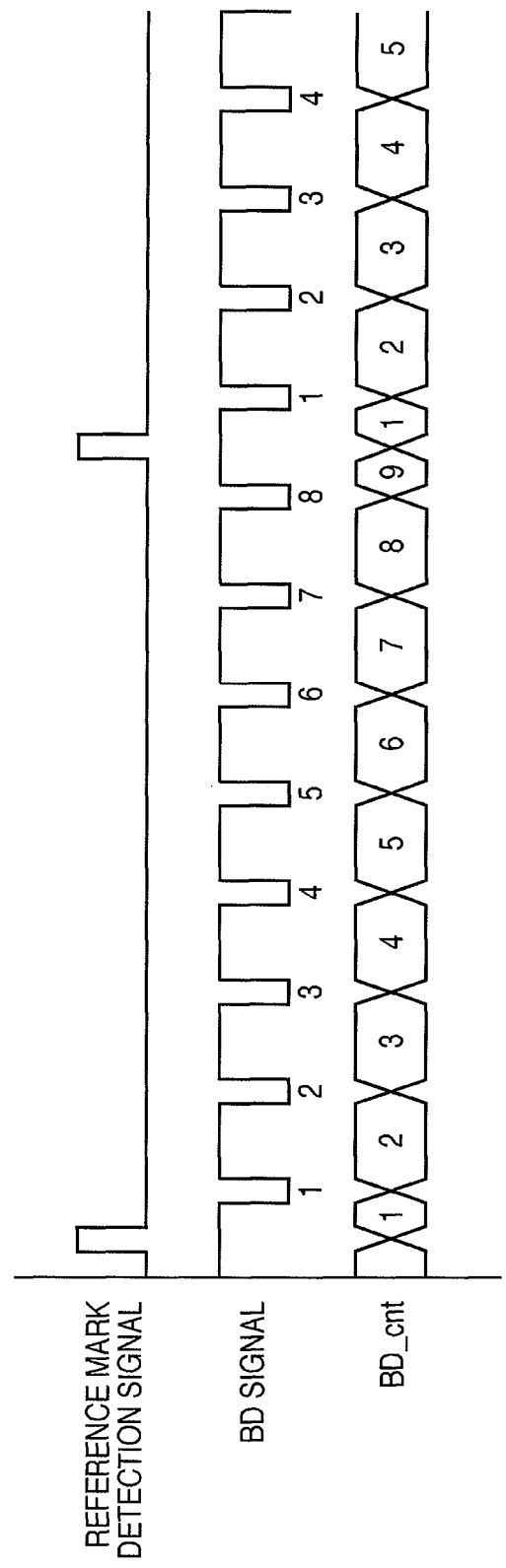

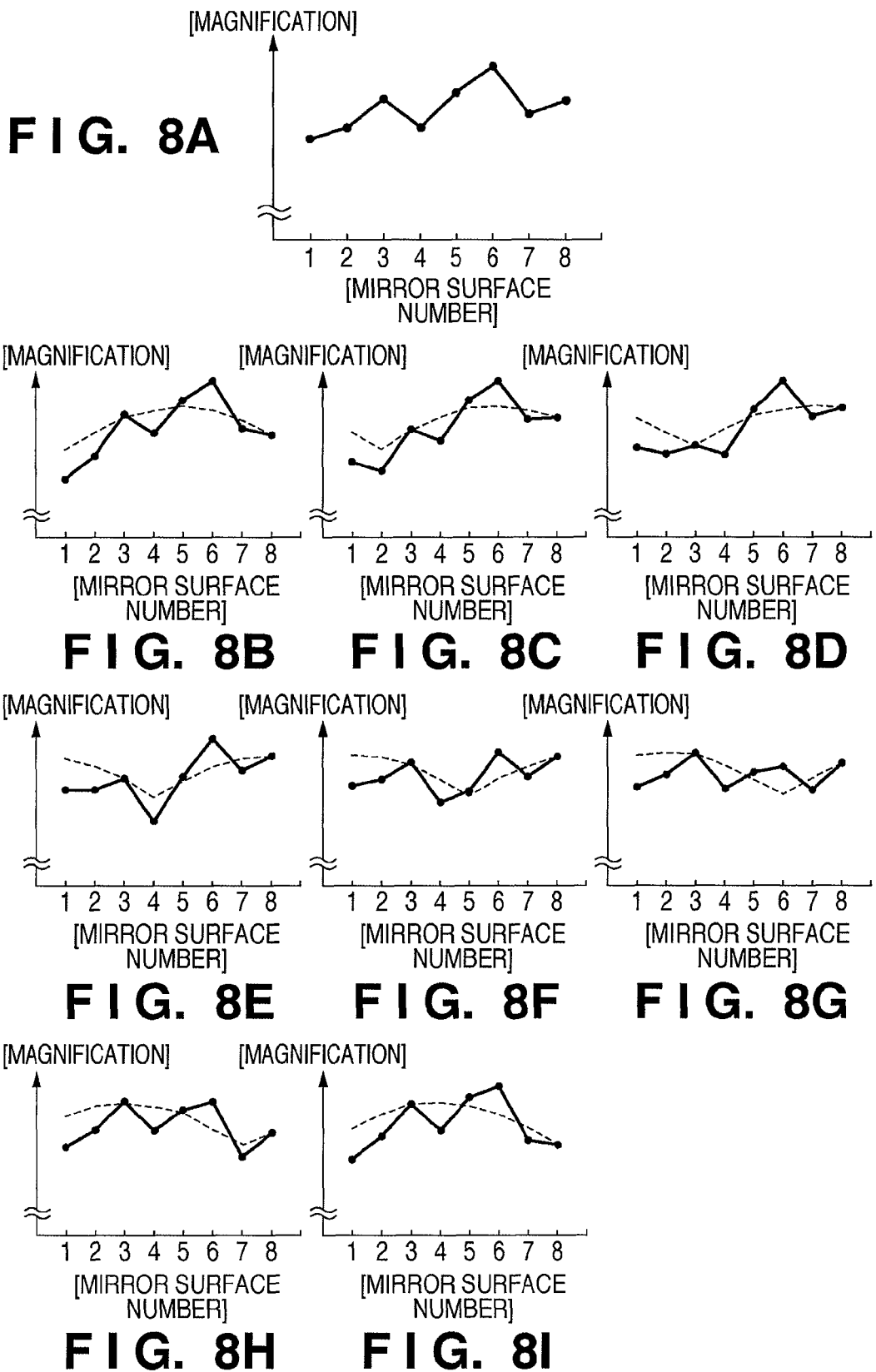

OPTICAL SCANNING APPARATUS

BACKGROUND OF THE INVENTION

1. Field of the Invention

The present invention relates to an optical scanning apparatus which deflection-scans an optical beam.

2. Description of the Related Art

Recently, digital copiers and printers have spread rapidly and various types of image forming apparatus have been put to practical use. A laser beam printer of an electrophotographic type, just one of various types, modulates a laser beam output from a semiconductor laser with an image signal, deflects the laser beam using a rotating polygonal mirror, and thereby scans a photosensitive drum. A latent image is formed on the photosensitive drum scanned with the laser beam and the latent image is developed into a toner image by a developing apparatus. The toner image is transferred from the photosensitive drum to paper via an intermediate transfer belt and then the toner image transferred onto the paper is fixed by heat treatment or the like.

In an image forming apparatus of such an electrophotographic type, a method which uses a main scanning synchronization signal (hereinafter referred to as a beam detection (BD) signal) is known as a method for controlling the rotational speed of a motor (hereinafter referred to as a polygonal motor) which rotationally drives a rotating polygonal mirror (Japanese Patent No. 3,526,136). The method detects the laser beam deflected by the rotating polygonal mirror, using an optical sensor (hereinafter referred to as a BD sensor) installed at a predetermined position, and outputs the detected signal as a BD signal. Next, the method frequency-divides the BD signal and controls the rotational speed of the polygonal motor to adjust the resulting period of the BD signal to a target period.

However, the above-described control method for controlling the rotational speed of the polygonal mirror has problems such as described below.

First, there are variations in laser beam scanning speed among mirror surfaces of the rotating polygonal mirror. Ideally, the rotating polygonal mirror has a regular polygonal shape. Actually, however, there are variations in surface geometry due to manufacturing errors. Since a reflection angle of the laser beam varies among the mirror surfaces due to the variations in surface geometry, the laser beam scanning speed varies among the mirror surfaces. Consequently, minute differences occur in magnification of scanning lines (length of scanning lines) in a scanning direction of the laser beam. That is, there are deviations in the magnification of formed scanning lines.

Moreover, when the rotational speed of the polygonal motor is controlled by supplying power to the polygonal motor, the rotational speed of the polygonal mirror may cause a repetition of minute fluctuations, which are visible when viewed closely. When the rotation of the polygonal motor is accelerated or decelerated, it takes a time equivalent to a few cycles of the BD signal from the time an acceleration/deceleration command is given until the rotational speed of the polygonal motor reaches a target speed.

To control the speed of the polygonal motor, the period of the BD signal is detected and power supply to the polygonal motor is increased or decreased based on an ACC signal or DEC signal output according to the detected period. In such a configuration, ideally power supply is increased or decreased until a voltage corresponding to the target speed of the polygonal motor is reached and then constant power is supplied to make the motor rotate stably at the target speed once the target speed is reached. Actually, however, charge supplied to the polygonal motor will leak. Consequently, even if the target speed is reached once, voltage of the polygonal motor will fall gradually, decreasing the rotational speed of the polygonal motor while a constant speed mode is maintained. This makes it necessary to supplement the charge periodically to make up for the leakage. In this way, when viewed closely, the rotational speed of the polygonal motor is accelerated and decelerated periodically.

When there are manufacturing errors of the polygonal mirror and variations in the rotational speed of the polygonal motor as described above, deviations in the magnification of the scanning lines attributable to the manufacturing errors of the polygonal mirror will increase unless the rotational speed of the polygonal motor is controlled with proper timing. That is, if the rotational speed of the polygonal motor is controlled with such timing that the rotational speed will be the lowest when the laser beam is deflected by the mirror surface on which the scanning line is the longest, the deviation in the magnification of the scanning lines in the laser scanning direction will be increased. The larger the deviation, the larger the variations in the scanning lines in the main scanning direction will be, resulting in degraded image quality. To improve the image quality, it is necessary to control the speed of the polygonal motor with optimum timing by taking into consideration accuracy in surface geometry of the polygonal mirror and control period of the polygonal motor.

SUMMARY OF THE INVENTION

Accordingly, a feature of the present invention is to solve at least one of the above and other problems. For example, it is a feature of the present invention to reduce image degradation caused by minute fluctuations in scanning magnification of a laser beam using a simple configuration. Other features will become apparent upon reading the entire present specification.

An optical scanning apparatus according to the present invention includes a light source which emits an optical beam, a deflection scanning unit, and a control unit. The deflection scanning unit includes a rotating polygonal mirror which deflection-scans the optical beam emitted from the light source so that the optical beam will scan an object to be scanned, and a drive unit which rotationally drives the rotating polygonal mirror. The control unit controls the rotational speed of the rotating polygonal mirror by accelerating or decelerating the drive unit at a predetermined time during one rotation of the rotating polygonal mirror. The predetermined time is a time when a deviation in length of a scanning line formed by each reflecting surface of the rotating polygonal mirror becomes relatively small.

Further features of the present invention will become apparent from the following description of exemplary embodiments (with reference to the attached drawings).

BRIEF DESCRIPTION OF THE DRAWINGS

FIG. 3 is a timing chart illustrating operation of a mirror surface identifying unit 32;

FIGS. 8A to 8I are graphs showing an example of scanning magnification of a laser beam on each mirror surface;

DESCRIPTION OF THE EMBODIMENTS

Embodiments of the present invention will be described below. The individual embodiments described below should be useful in understanding various concepts of the present invention including superordinate concepts, intermediate concepts, and subordinate concepts. It is to be understood that the technical scope of the present invention is defined only by the appended claims, and is not limited to any particular embodiment described below.

Figure 15:
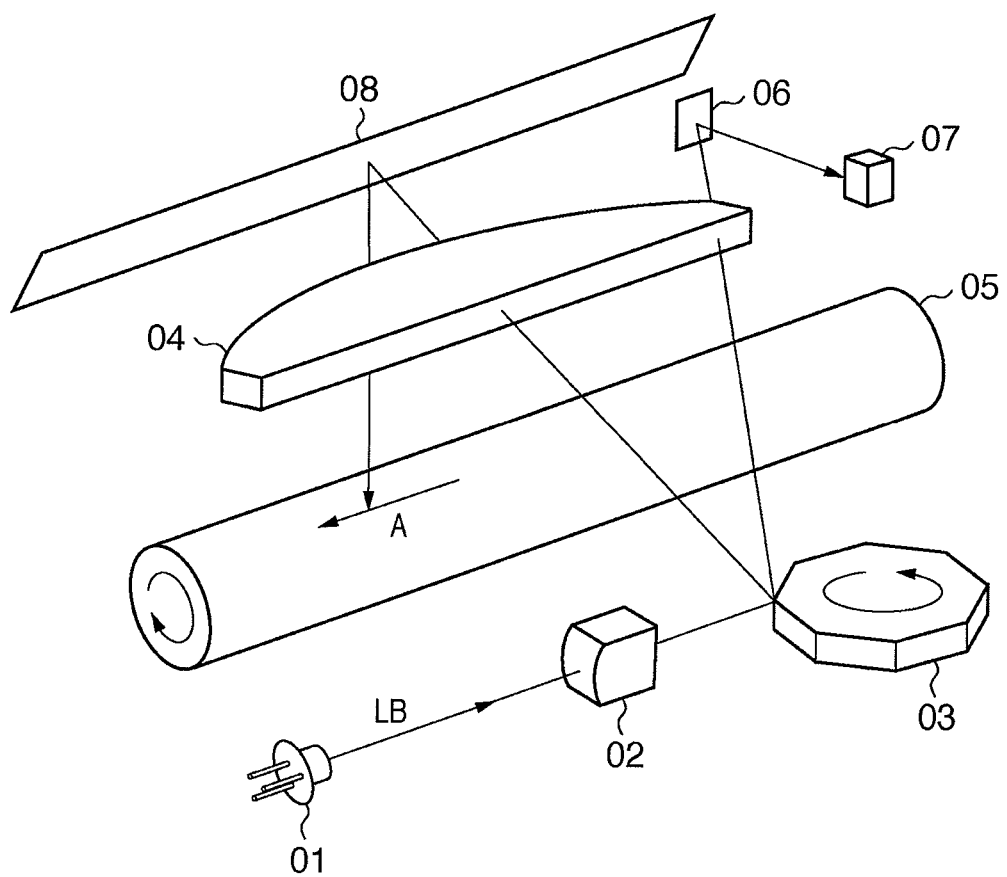
FIG. 15 is a diagram showing a schematic configuration of a laser beam scanning system of a laser beam printer.

FIG. 15 is a diagram showing a schematic configuration of a laser beam scanning system of a laser beam printer. The laser beam scanning system of the laser beam printer includes a semiconductor laser 01, rotating polygonal mirror 03, and fθ lens 04 and other components. The laser beam scanning system forms a latent image on a photosensitive drum 05 based on image data. A laser beam LB emitted from the semiconductor laser 01 passes through a cylindrical lens 02 and reaches the rotating polygonal mirror 03. The rotating polygonal mirror 03 is rotationally driven by a polygonal motor (not shown). The laser beam LB is pulse-width modulated by an image signal. Upon reaching the rotating polygonal mirror 03, the laser beam LB is deflected by the rotating polygonal mirror 03 and converted by the fθ lens 04 so that the linear velocity of light projected onto a plane will be uniform. Consequently, the laser beam LB scans a surface of the photosensitive drum 05 at uniform velocity in the direction of arrow A in FIG. 15. After passing through the fθ lens 04, the laser beam LB is reflected by a BD reflecting mirror 06 and received by a BD sensor 07. The BD reflecting mirror 06 is installed in such a position as not to block the laser beam heading toward that part (hereinafter referred to as an image region) of a surface region of the photosensitive drum 05 in which an image is formed. In the image region, after passing through the fθ lens 04, the laser beam LB is reflected by a turn-back mirror 08 to illuminate the photosensitive drum 05. The photosensitive drum 05 has been precharged by an electrostatic charger (not shown), and a latent image is formed on the photosensitive drum 05 illuminated with the laser beam LB.

Figure 16:
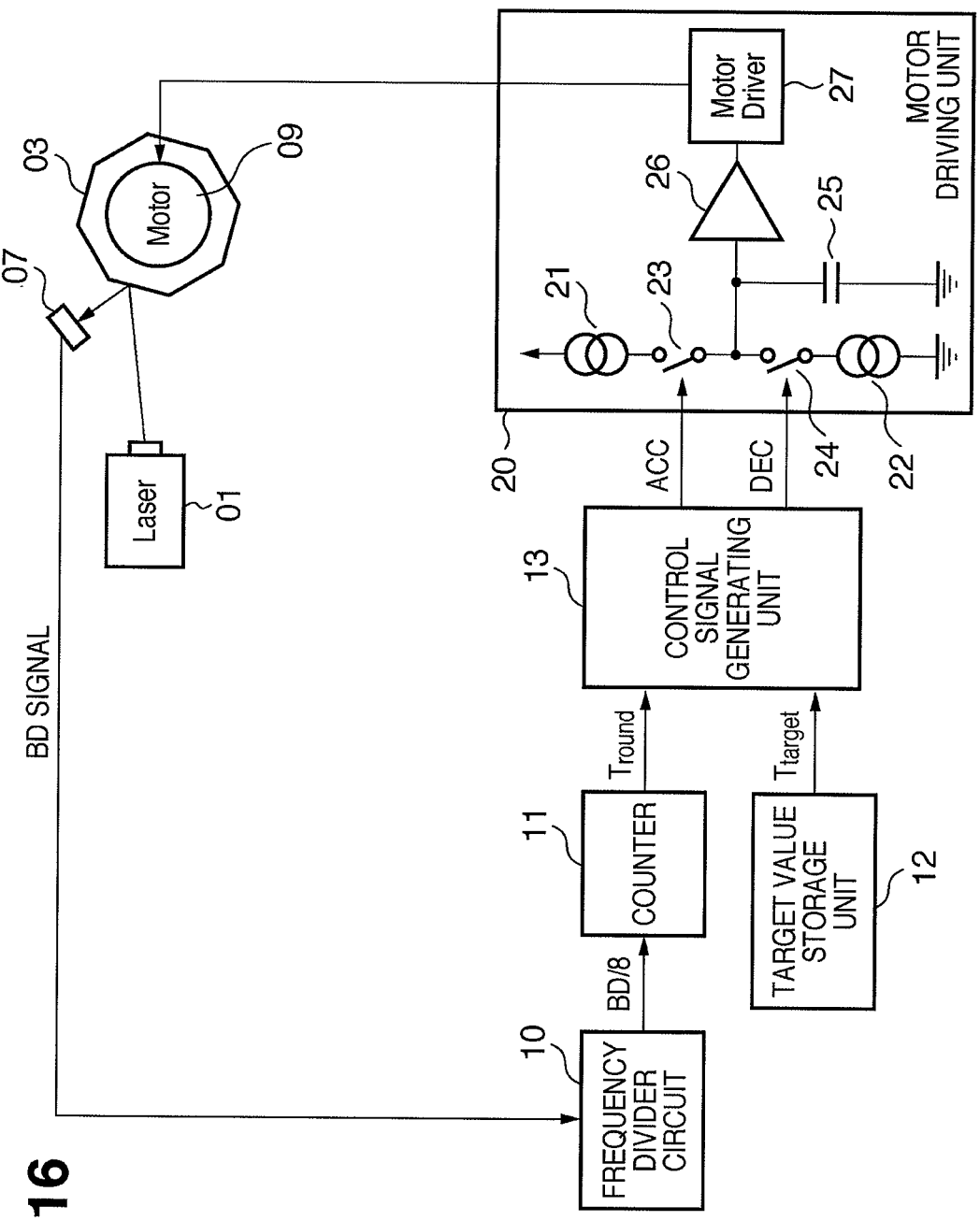
FIG. 16 is a block diagram of a control circuit.

FIG. 16 is a block diagram of a control circuit. A speed control method for the polygonal motor will be described with reference to FIG. 16. In FIG. 16, a polygonal motor 09 and the like are added schematically. The BD reflecting mirror 06 for signal detection and some other components are omitted.

As shown in FIG. 16, a BD signal which is a main scanning synchronization signal is input to a frequency divider circuit 10. The frequency divider circuit 10 frequency-divides the BD signal by the number of mirror surfaces of the rotating polygonal mirror 03. In FIG. 16, the number of mirror surfaces is "8."

The BD signal (BD/8 signal) frequency-divided by the frequency divider circuit 10 is input to a counter 11. The counter 11 measures a period of the BD/8 signal, that is, a rotation period of the polygonal motor 09.

A control signal generating unit 13 accepts, as inputs, a count value (Tround) of the counter 11 and a target period (Ttarget) stored in a target value storage unit 12 and calculates an amount of control (acceleration or deceleration) for the polygonal motor 09. The control signal generating unit 13 generates an ACC signal (acceleration signal) or DEC signal (deceleration signal) based on the calculated amount of control. Incidentally, the target period Ttarget used here is a target period of the BD/8 signal.

The ACC signal or DEC signal generated by the control signal generating unit 13 is input to a motor driving unit 20. The motor driving unit 20 includes constant current sources 21 and 22, switching elements 23 and 24, a charge pump capacitor 25, an amplifier 26, and a motor driver 27.

The constant current sources 21 and 22 and switching elements 23 and 24 make up a charge/discharge circuit of the charge pump capacitor 25. Voltage applied to the charge pump capacitor 25 is controlled using the ACC signal and DEC signal generated by the control signal generating unit 13. The voltage is transmitted to the motor driver 27 via the amplifier 26 in the following stage. The motor driver 27 supplies power proportional to the voltage to rotate the polygonal motor 09.

First Embodiment

Figure 1:
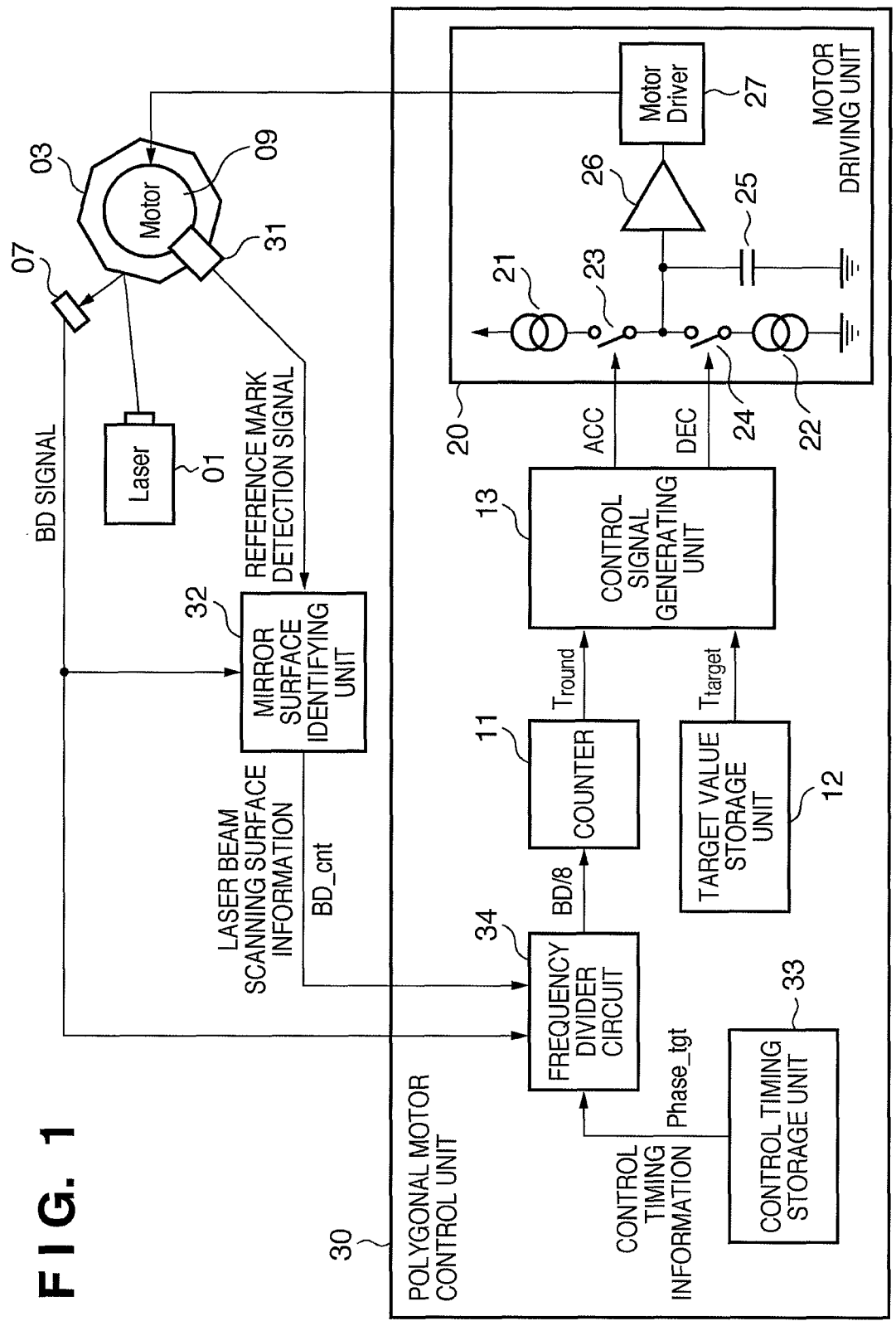
FIG. 1 is a block diagram of a polygonal motor control circuit of a laser beam scanning apparatus according to a first embodiment.

FIG. 1 is a block diagram of a polygonal motor control circuit of a laser beam scanning apparatus according to a first embodiment. Configuration of the laser beam scanning system is the same as the conventional one shown in FIG. 15, and thus description thereof will be omitted.

As shown in FIG. 1, a BD signal which is a main scanning synchronization signal is input to a mirror surface identifying unit 32 and frequency divider circuit 34. The mirror surface identifying unit 32 (reflecting-surface identification unit) identifies a mirror surface which is reflecting a laser beam. When the rotating polygonal mirror 03 has eight mirror surfaces, the mirror surface identifying unit 32 identifies which of the first to eighth mirror surfaces is reflecting the laser beam. In addition to the BD signal, a reference mark detection signal obtained by detecting a reference mark put on the polygonal mirror is input to the mirror surface identifying unit 32. The reference mark detection signal is output by a reference mark detection unit 31. The mirror surface identifying unit 32 outputs laser beam scanning surface information to the frequency divider circuit 34, indicating the surface which is deflecting the laser beam.

Incidentally, the semiconductor laser 01 is an example of a light source which emits an optical beam, but another type of light source may be used alternatively. Also, the rotating polygonal mirror 03 is an example of a deflection scanning unit which deflection-scans the optical beam emitted from a light source. The BD sensor 07 is an example of a detection unit which detects the optical beam from the deflection scanning unit. Also, the mirror surface identifying unit 32 is an example of a mirror surface identification unit which identifies the mirror surface which is reflecting the optical beam out of multiple mirror surfaces of the deflection scanning unit. The polygonal motor 09 is an example of a drive unit which drives the deflection scanning unit. A polygonal motor control unit 30 is an example of a control unit which accelerates, decelerates, or maintains the speed of the drive unit based on detection results produced by the detection unit and controls the drive unit based on identification results produced by the mirror surface identification unit and control timing information stored in a storage unit.

In addition to the laser beam scanning surface information, the BD signal and control timing information are also input to the frequency divider circuit 34. The control timing information takes the form of a mirror surface number and is stored in a control timing storage unit 33. The frequency divider circuit 34 frequency-divides the BD signal and outputs a resulting BD/8 signal to the counter 11. The control timing storage unit 33 is an example of a storage unit which stores control timing information which indicates when to accelerate or decelerate the drive unit. In this way, the control timing information indicates that the drive unit should be accelerated or decelerated at a time when the optical beam deflected by a specific mirror surface out of multiple mirror surfaces is detected by the detection unit. The control timing information is determined based on scanning characteristics of the optical beam on the mirror surface.

Figure 2A:
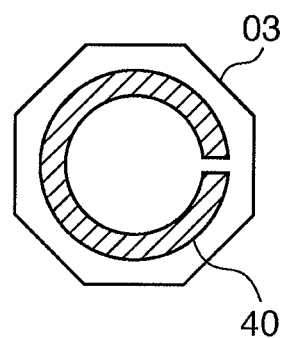
FIGS. 2A and 2B are plan view and side view of a rotating polygonal mirror 03, respectively.
Figure 2B:
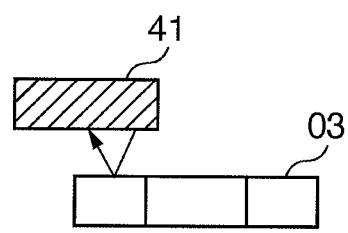

FIG. 2A is a plan view of the rotating polygonal mirror 03 and FIG. 2B is a side view of the rotating polygonal mirror 03. As shown in FIG. 2A, a reference mark 40 which has a shape of an open-ended ring is formed on the top face of the rotating polygonal mirror 03. The open-ended part has a different reflectivity from that of the remaining part of the reference mark 40.

Because the reference mark 40 is detected using an optical sensor 41 which has a light-emitting unit and light-receiving unit as shown in FIG. 2B while the polygonal mirror 03 is rotated, a pulse signal which indicates the reference position is generated once per rotation. The reference mark 40 is placed relative to the optical sensor 41 such that a pulse signal will be output after the laser beam reflected by the eighth surface is detected by the BD sensor 07, but before the laser beam reflected by the first surface is detected by the BD sensor 07. The reference mark detection signal thus generated is input to the mirror surface identifying unit 32. Although an example of an optical technique has been described above, another technique may be used, such as a magnetic technique which uses magnets and a Hall element or a mechanical technique which uses contacts.

FIG. 3 is a timing chart illustrating operation of the mirror surface identifying unit 32. The reference mark detection signal is an active high signal. After the laser beam deflected by the eighth surface is detected by the BD sensor 07, but before the laser beam deflected by the first surface is detected by the BD sensor 07, a pulse signal is generated, indicating that the rotating polygonal mirror 03 has made one rotation.

As shown in FIG. 3, the BD signal is an active low signal. A pulse is generated each time the laser beam deflected by the rotating polygonal mirror 03 is detected by the BD sensor 07. In FIG. 3, a number is added under each pulse of the BD signal to indicate the surface number of the mirror surface which is deflecting the laser beam. That is, the pulse denoted by '1' is generated when the laser beam deflected by the first surface is detected by the BD sensor 07.

The mirror surface identifying unit 32 includes a counter and a BD_cnt signal in FIG. 3 is a count value of the counter. The counter of the mirror surface identifying unit 32 is set to '1' in synchronization with a rising edge of the reference mark detection signal and incremented in synchronization with a falling edge of the BD signal. By referring to the BD_cnt signal which represents the count value of the counter operating in this way, it is possible to identify which mirror surface is deflecting the laser beam when a pulse of the BD signal is generated.

In this way, the mirror surface identifying unit 32 identifies the mirror surface which is deflecting the laser beam and outputs the BD_cnt signal which represents the count value of the counter, as laser beam scanning surface information. The laser beam scanning surface information thus generated by the mirror surface identifying unit 32 is input to the frequency divider circuit 34.

In addition to the laser beam scanning surface information, the BD signal and control timing information are input to the frequency divider circuit 34. Specifically, the control timing information takes the form of a mirror surface number and is stored in the control timing storage unit 33. The frequency divider circuit 34 frequency-divides the BD signal by the number of mirror surfaces.

The reason why the BD signal is frequency-divided will now be described. Not all of the mirror surfaces of the rotating polygonal mirror 03 are identical, and there are variations in surface accuracy and the like of the mirror surfaces. Consequently, even if the polygonal motor rotates at a completely uniform speed, there will be variations in the period of the BD signal.

Figure 4:
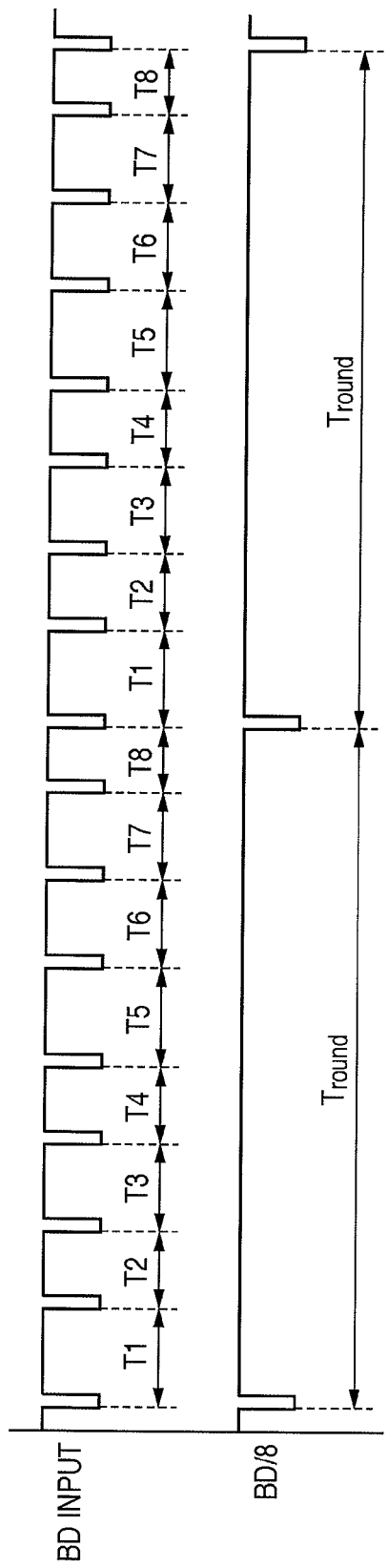
FIG. 4 is a diagram illustrating variations in a period of a BD signal.

FIG. 4 is a diagram illustrating variations in the period of the BD signal. When the rotating polygonal mirror 03 has eight mirror surfaces, BD signal pulses generated by the eight mirror surfaces have periods T1, T2, T3, T4, T5, T6, T7, and T8, respectively, as exemplified by an input signal waveform shown in FIG. 4. Consequently, the BD signal pulses with these periods are generated cyclically.

For example, even if the polygonal motor 09 is rotating at target speed, if the periods of the BD signal pulses are not constant, it is not possible to control the polygonal motor 09 properly. On the other hand, if the BD signal is frequency-divided by 8 to generate a BD/8 signal, the waveform is shaped such that the signal (BD/8 signal) will give one pulse per rotation of the polygonal motor 09, as exemplified by a BD/8 signal waveform shown in FIG. 4. Consequently, if the rotational speed of the polygonal motor 09 remains stable at the target speed, since the period of the BD/8 signal is not affected by variations in the surface accuracy of the rotating polygonal mirror, the period of the BD/8 signal always remains constant (Tround).

In other words, since the BD/8 signal can alleviate the effects of variations in the surface accuracy of the rotating polygonal mirror 03, it becomes possible to measure a rotation period of the polygonal motor 09 accurately. For the reason described above, a signal obtained by frequency-dividing the BD signal by the number of mirror surfaces of the rotating polygonal mirror 03 is used as a reference signal in detecting the speed of the polygonal motor 09.

Figure 5:
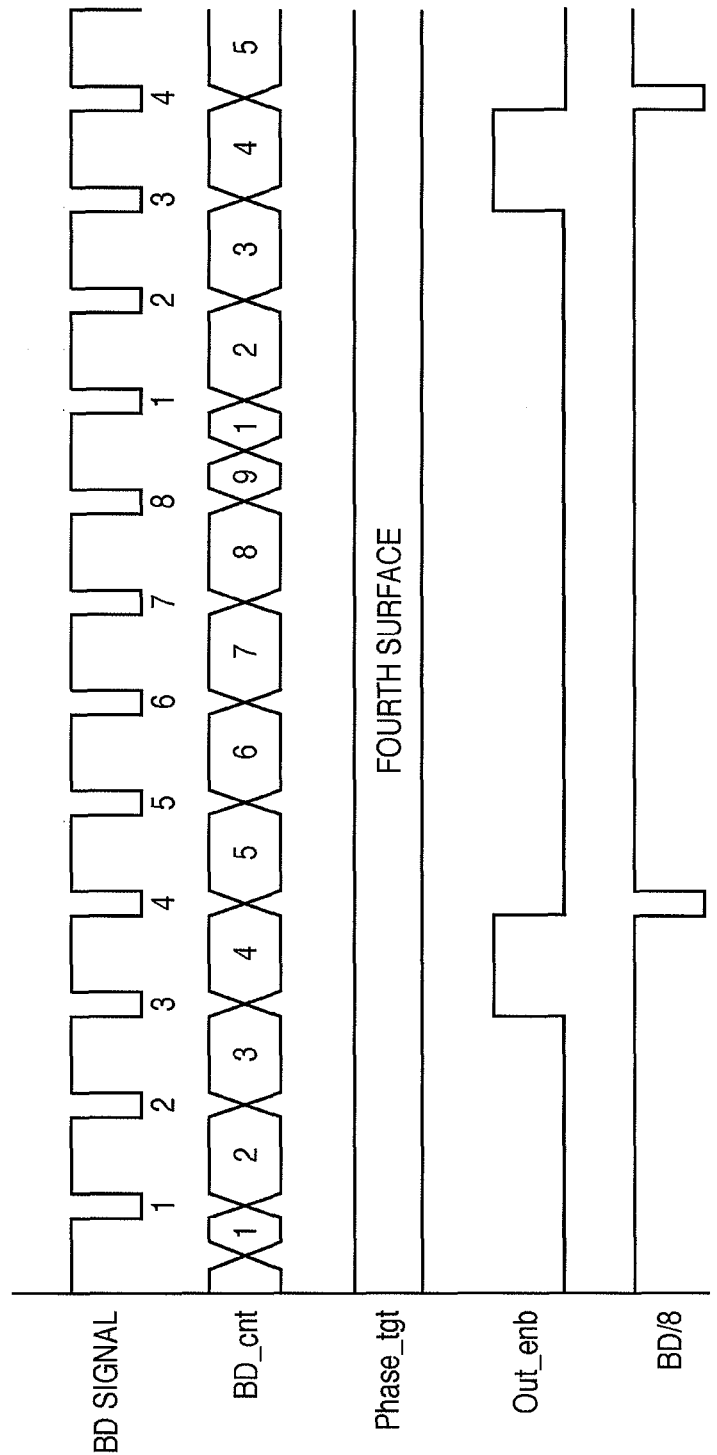
FIG. 5 is a timing chart illustrating operation of a frequency divider circuit 34.

FIG. 5 is a timing chart illustrating operation of the frequency divider circuit 34. The BD signal is the same as the one shown in FIG. 3 and the numbers attached have the same meanings. Also, the BD_cnt signal, which is the same as the one shown in FIG. 3, represents the laser beam scanning surface information shown in FIG. 1.

A Phase_tgt signal represents the control timing information shown in FIG. 1. Specifically, it is a mirror surface number as described above. In FIG. 5, "fourth surface" is input as the control timing information in the frequency divider circuit 34.

Upon detecting a rising edge of the BD signal, the frequency divider circuit 34 refers to the BD_cnt signal and Phase_tgt signal. Furthermore, when Eq. (1) is satisfied, the frequency divider circuit 34 asserts an Out_enb signal which is an internal signal of the frequency divider circuit 34. On the other hand, when Eq. (1) is not satisfied, the frequency divider circuit 34 deasserts the Out_enb signal.

$$\{BD\_cnt=\text{Phase}\_tgt-1\} \text{ or } \{(BD\_cnt=8) \text{ and } (\text{Phase}\_tgt=1)\} \quad (1)$$

In FIG. 5, the Phase_tgt signal is '4.' Thus, when a falling edge of the BD signal occurs while the BD_cnt signal is '3,', the Out_enb signal, which is an active high signal, is set High by the frequency divider circuit 34. Furthermore, on the next falling edge of the BD signal, the BD_cnt signal is '4,' which does not satisfy Eq. (1). Thus, the frequency divider circuit 34 sets the Out_enb signal Low.

Out of the pulses of the BD signal, the frequency divider circuit 34 outputs only the pulses whose falling edges occur when the Out_enb signal is High to the subsequent stage as the BD/8 signal. In the example of FIG. 5, the frequency divider circuit 34 outputs, as the BD/8 signal, only the pulses generated when Out_enb signal is High, that is, only the pulses obtained by detecting the laser beam deflected by the fourth surface.

In this way, the frequency divider circuit 34 outputs, as the BD/8 signal, only the pulses obtained by detecting the laser beam deflected by the mirror surface represented by the mirror surface number stored in the control timing storage unit 33. In other words, the frequency divider circuit 34 frequency-divides the BD signal by taking into consideration a phase of the BD signal.

The BD/8 signal output from the frequency divider circuit 34 is input to the counter 11. The counter 11 is an up counter which counts a clock (not shown). The counter 11 counts the period of the BD/8 signal, that is, the rotation period of the polygonal motor 09 by clearing the count value each time the BD/8 signal is input. The count value (Tround) of the counter 11 is input to the control signal generating unit 13.

Figure 6:
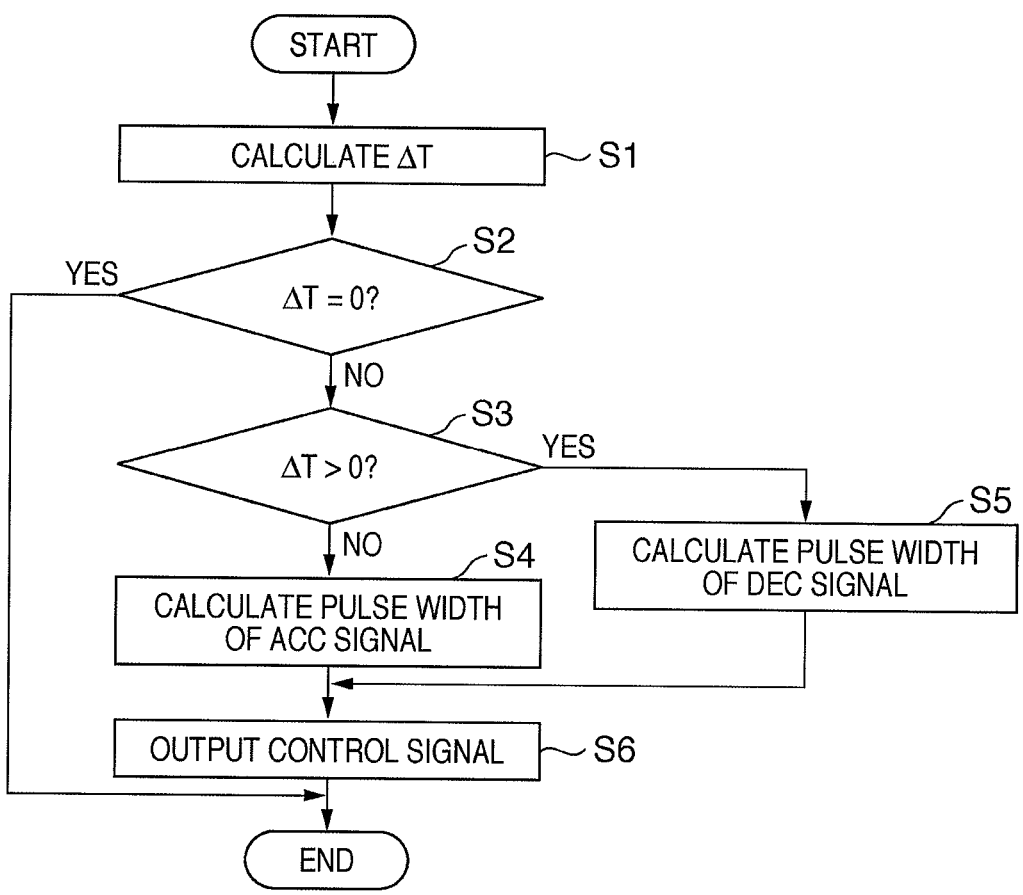
FIG. 6 is a flowchart illustrating operation of a control signal generating unit 13.

FIG. 6 is a flowchart illustrating operation of the control signal generating unit 13. The control signal generating unit 13 includes a CPU (not shown). The control signal generating unit 13 starts operation when the Tround value is updated. First, in step S1, the control signal generating unit 13 calculates a difference ΔT between Tround and Ttarget. Ttarget corresponds to the target value stored in the target value storage unit 12.

In step S2, the control signal generating unit 13 evaluates the value of ΔT. For example, the control signal generating unit 13 determines whether or not the value of ΔT is "0." If the value of ΔT is "0," meaning that the rotating polygonal mirror 03 is rotating at the target period, the control signal generating unit 13 finishes operation. The control signal generating unit 13 starts operation again the next time the Tround value is updated. On the other hand, if the value of ΔT is not "0," the control signal generating unit 13 goes to step S3.

In step S3, the control signal generating unit 13 evaluates the value of ΔT again. For example, the control signal generating unit 13 determines whether or not the value of ΔT is negative. A negative value of ΔT means that the measured period Tround is larger than the target period Ttarget, that is, the polygonal motor is rotating at a speed lower than the target speed. In that case, the control signal generating unit 13 goes to step S4.

In step S4, the control signal generating unit 13 calculates a pulse width which corresponds to a time duration for which the ACC signal will be kept active. The pulse width of the ACC signal is calculated, for example, using Eq. (2).

$$ACC\_PW = \alpha_{ACC} \cdot \Delta T + \beta_{ACC} \quad (2)$$

where $\alpha_{ACC}$ and $\beta_{ACC}$ are constants related to characteristics of the polygonal motor, characteristics of the charge/discharge circuit, and the like. In step S4, pulse width of the DEC signal is set to "0."

On the other hand, if it is determined in step S3 that the value of ΔT is positive, the control signal generating unit 13 goes to step S5. A positive value of ΔT means that the measured period Tround is smaller than the target period Ttarget, that is, the polygonal motor is rotating at a speed higher than the target speed. Thus, in step S5, the control signal generating unit 13 calculates a pulse width which corresponds to a time duration for which the DEC signal will be kept active. The pulse width of the DEC signal is calculated, for example, using Eq. (3).

$$DEC\_PW = \alpha_{DEC} \cdot \Delta T + \beta_{DEC} \quad (3)$$

where $\alpha_{DEC}$ and $\beta_{DEC}$ are constants related to characteristics of the polygonal motor, characteristics of the charge/discharge circuit, and the like. In step S5, the pulse width of the ACC signal is set to "0."

In step S6, the control signal generating unit 13 keeps the ACC signal or DEC signal active for the duration of the pulse width calculated in step S4 or step S5. In this way, the control signal generating unit 13 outputs the pulse widths of the ACC signal and DEC signal by calculating them based on the target period Ttarget stored in the target value storage unit 12 as well as on the measured period Tround.

Incidentally, the control signal generating unit 13 may calculate the pulse widths of the ACC signal and DEC signal using formulae other than Eq. (2) and Eq. (3). Alternatively, ΔT may be calculated using a subtracter and the pulse widths of the ACC signal and DEC signal may be determined by using ΔT as an input and referring to a lookup table.

The ACC signal and DEC signal generated by the control signal generating unit 13 as described above are input to the motor driving unit 20. The motor driving unit 20 includes the constant current sources 21 and 22, switching elements 23 and 24, charge pump capacitor 25, amplifier 26, and motor driver 27. The charge pump capacitor 25 is an example of a capacitor which is charged or discharged in response to the speed of the drive unit being accelerated, decelerated, or maintained. The motor driver 27 is an example of a driver which supplies power to the drive unit according to capacitor voltage.

The constant current sources 21 and 22 and switching elements 23 and 24 make up the charge/discharge circuit of the charge pump capacitor 25. When the ACC signal, which is a low active signal, goes Low, the switching element 23 turns on, and the charge pump capacitor 25 is charged via the constant current source 21. On the other hand, when the DEC signal, which is a low active signal, goes Low, the switching element 24 turns on, and the charge pump capacitor 25 is discharged via the constant current source 22. Thus, the voltage of the charge pump capacitor 25 increases and decreases depending on the widths of the ACC and DEC signal pulses when the signals are Low. The voltage is transmitted to the motor driver 27 via the amplifier 26 in the next stage.

Figure 7A:
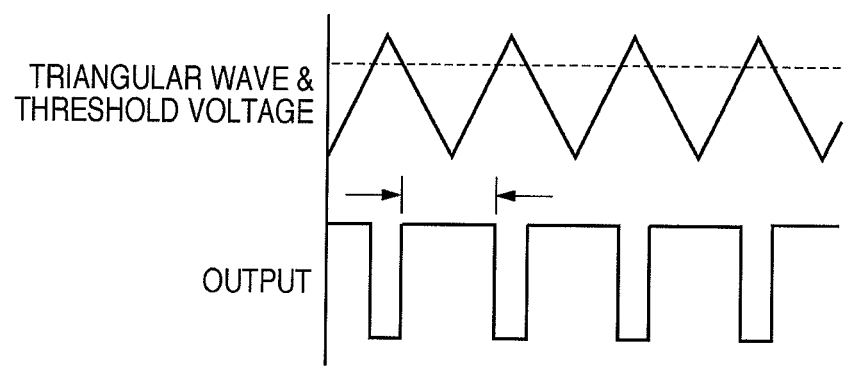
FIGS. 7A and 7B are diagrams illustrating basic operation of a motor driver 27.
Figure 7B:
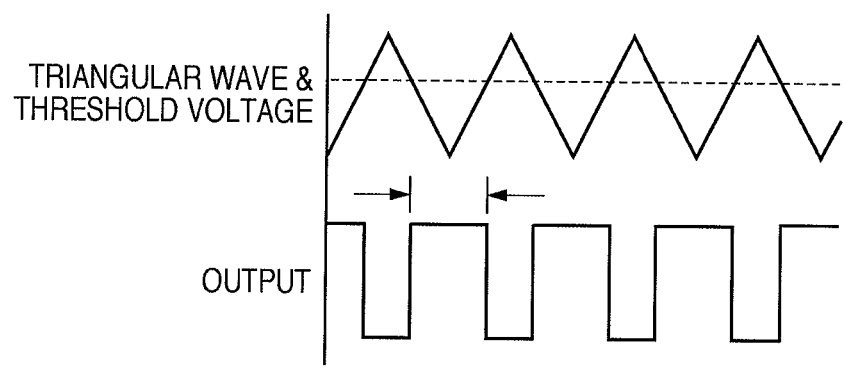

FIGS. 7A and 7B are diagrams illustrating basic operation of the motor driver 27. The waveform indicated by solid lines at the top of FIG. 7A represents a triangular wave signal generated in the motor driver 27. The broken line indicates the voltage value transmitted from the amplifier 26. The voltage value is used as a threshold voltage. The motor driver 27 compares the triangular wave signal with the threshold voltage indicated by the broken line and supplies power to the polygonal motor 09 only while the triangular wave signal is smaller than the threshold voltage. Consequently, power supply to the polygonal motor 09 exhibits the waveform shown at the bottom of FIG. 7A.

The threshold voltage in FIG. 7B is lower than the threshold voltage in FIG. 7A. Thus, as shown by the waveform at the bottom of FIG. 7B, the duration of power supply to the polygonal motor 09 is shorter than in FIG. 7A. Therefore, more power is supplied to the polygonal motor 09 in FIG. 7A than in FIG. 7B, causing the polygonal motor 09 to rotate more rapidly.

In this way, the motor driver 27 supplies power to the polygonal motor using pulse width modulation control. That is, the rotational speed of the polygonal motor 09 changes according to the voltage value transmitted from the amplifier 26.

Now, control timing information stored in the control timing (a first timing to control the rotational speed of the polygonal mirror) storage unit 33 will be described below. As described above, the control timing information specifically takes the form of a mirror surface number. The mirror surface number stored as the control timing information is determined according to variations in the laser beam scanning speed among the mirror surfaces resulting from variations in surface geometry of the rotating polygonal mirror. This will be described with reference to FIGS. 8A to 8I.

FIGS. 8A to 8I are graphs showing an example of variations in scanning magnification of a laser beam among the mirror surfaces (deviations in magnification of scanning lines formed by a laser beam scanned for each of the mirror surfaces), where the abscissa represents the mirror surface number and the ordinate represents the scanning magnification of the laser beam. FIG. 8A shows only fluctuations in the scanning magnification of the laser beam attributable to the variations in the surface geometry of the rotating polygonal mirror. That is, FIG. 8A shows fluctuations in the scanning magnification assuming ideal conditions in which the polygonal motor is rotating uniformly without any charge leakage of the charge pump capacitor. Basically, the polygonal motor control unit 30 tries to keep the magnification substantially constant among the mirror surfaces of the polygonal mirror, by accelerating, decelerating, or maintaining the speed of the polygonal motor based on detection results produced by the BD sensor 07. However, as shown in FIG. 8A, even if the polygonal motor 09 rotates at an ideally uniform speed, magnification fluctuations occur cyclically.

FIGS. 8B to 8I show the scanning magnification of the laser beam on each mirror surface when the rotating polygonal mirror 03 is rotated by actually charging the charge pump capacitor 25 each time the polygonal motor makes one rotation. The broken line indicates only magnification fluctuations attributable to speed fluctuations of the rotating polygonal mirror caused by supplementing the charge pump capacitor 25 periodically with a charge equal in amount to the leaked charge. The solid line plots the total fluctuations in the scanning magnification of the laser beam obtained by adding magnification fluctuations resulting from the variations in the surface geometry shown in FIG. 8A to the fluctuations indicated by the broken line. That is, the solid line represents actually occurring fluctuations in the scanning magnification of the laser beam.

FIG. 8B shows magnification fluctuations which occur when the control timing information indicates the first surface. In this case, an acceleration command is given by detecting the laser beam deflected by the first surface and thereby measuring the period of the BD signal. That is, immediately after the laser beam deflected by the first surface is detected by the BD sensor 07, the charge pump capacitor 25 is charged to accelerate the polygonal motor 09. Next, as the second surface and the third surface through to the eighth surface are scanned, the charge leaks from the charge pump capacitor and the polygonal motor decelerates gradually.

FIGS. 8C to 8I similarly show magnification fluctuations which occur when the control timing information indicates the second to eighth surfaces, respectively. When FIGS. 8B to 8I are compared, it can be seen that the magnitude of the total fluctuations in the scanning magnification of the laser beam varies with the timing of giving an acceleration command to the polygonal motor 09. In the example shown in FIGS. 8A to 8I, the fluctuations in the magnification (deviation in scanning lines) are the smallest when the control timing information indicates the sixth surface (FIG. 8G). In such a case, the control timing information is set to indicate the sixth surface. In this way, the magnification of each mirror surface constituting rotating polygonal mirror 03 is measured by changing the mirror surface each time the charge pump capacitor 25 is supplemented with charge (hereinafter, the mirror subject to supplement charge) and the mirror surface which minimizes the variations in the magnification is selected as a specific mirror surface. Next, the mirror surface number of the selected mirror surface is set in the control timing information.

The polygonal motor control unit 30 compensates the charge pump capacitor 25 for leakage when the optical beam deflected by the sixth surface is detected by the BD sensor 07. Thus, the polygonal motor control unit 30 can be considered to be an example of a leakage compensation unit. Desirably, all leakage is compensated for, but it is sufficient if at least part of the leakage is compensated for by supplying charge to the charge pump capacitor 25. The polygonal motor control unit 30 supplements the charge pump capacitor 25 with charge when the optical beam deflected by the sixth surface specified by the control timing information is detected by the BD sensor 07. Thus, the polygonal motor control unit 30 is an example of a supplementing unit.

By controlling the speed of the polygonal motor using the control timing information determined in the manner described above, an acceleration command is output with timing which minimizes the fluctuations in the scanning magnification of the laser beam. Whereas with the conventional technique, the control timing varies with each start/stop cycle, the present invention makes it possible to perform control with timing which minimizes the fluctuations in the scanning magnification of the laser beam even when the polygonal motor repeats start/stop cycles.

The control timing information described above can be determined during manufacture of the laser beam scanning apparatus. That is, the control timing information can be determined and stored in a non-volatile memory before shipment by measuring the scanning magnification of the laser beam by changing the control timing in sequence.

Alternatively, a mechanism for measuring the scanning magnification of the laser beam may be built into the laser beam scanning apparatus and the control timing information can be determined by measuring in the apparatus. In that case, the control timing information is determined by measuring the scanning magnification of the laser beam by changing the control timing in sequence in the apparatus.

Figure 9:
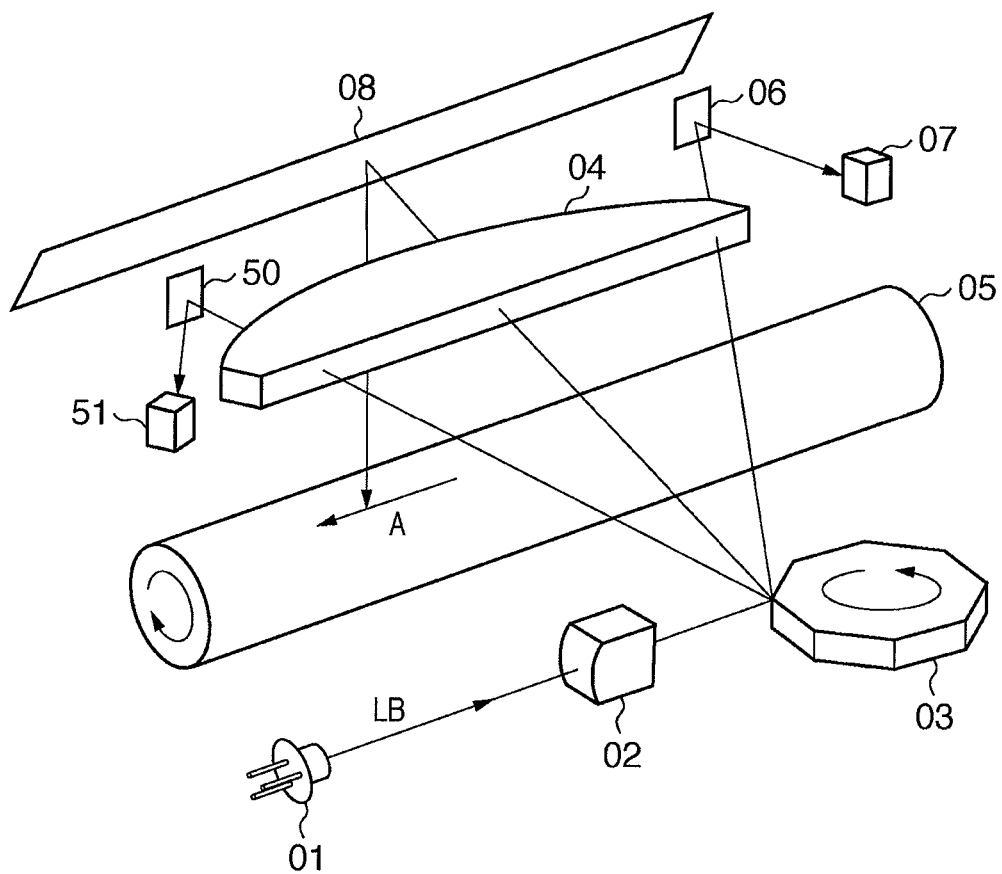
FIG. 9 is a diagram showing a laser beam scanning apparatus equipped with a mechanism for measuring scanning magnification.

FIG. 9 is a diagram showing a laser beam scanning apparatus equipped with a mechanism for measuring scanning magnification. In FIG. 9, a second BD reflecting mirror 50 and second BD sensor 51 are installed at the scan end position. By measuring the interval between the time when the laser beam is detected by the BD sensor 07 installed at the scan start position and the time when the laser beam is detected by the second BD sensor 51, it is possible to measure the scanning magnification. Using this measuring method for scanning magnification, it is possible to determine the control timing information as described above.

Figure 10:
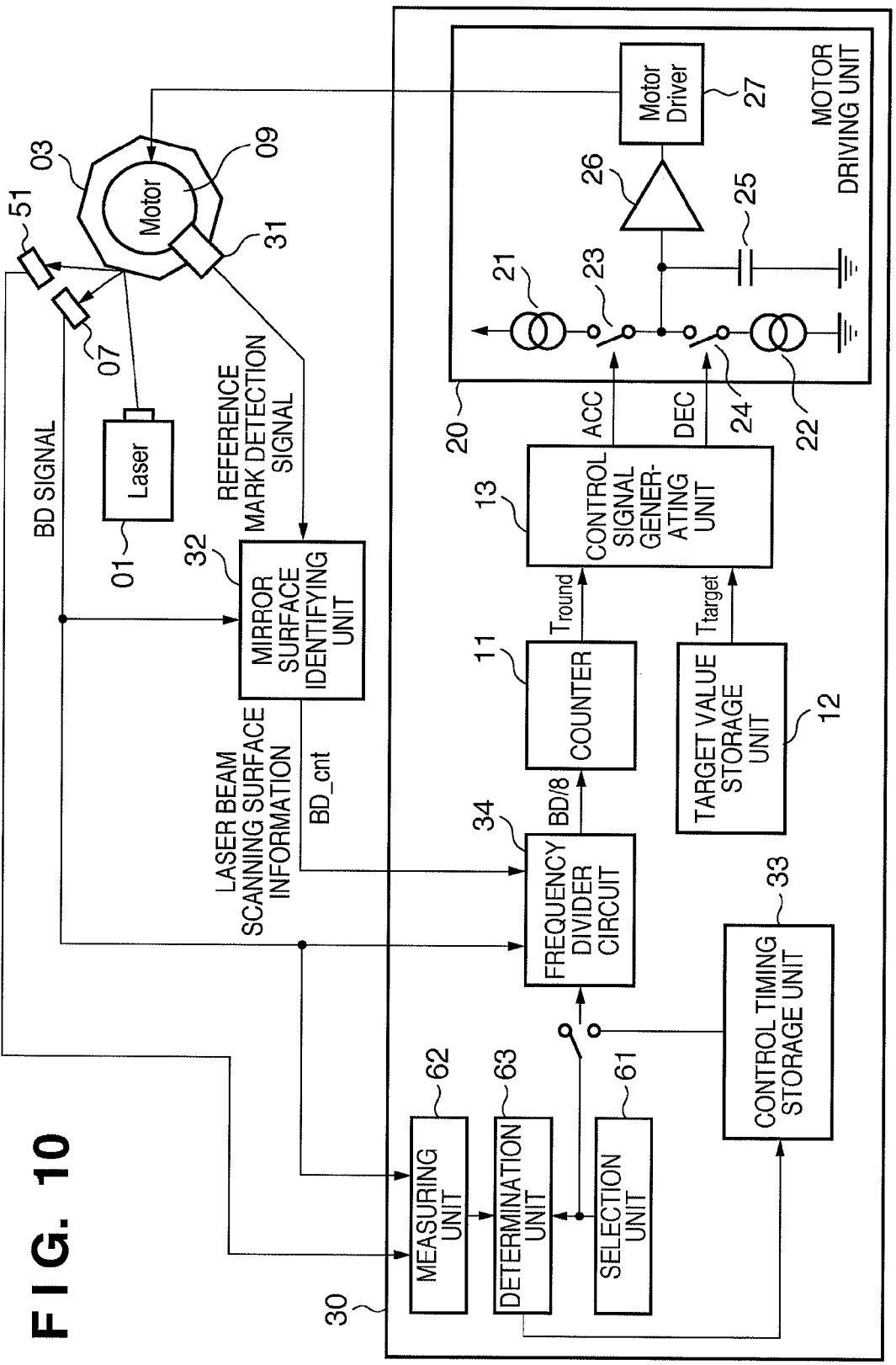
FIG. 10 is a block diagram showing an example of a polygonal motor control unit equipped with a mechanism for measuring scanning magnification.

FIG. 10 is a block diagram showing an example of a polygonal motor control unit equipped with a mechanism for measuring scanning magnification. A selection unit 61 selects mirror surfaces which correspond to the timing of charging the charge pump capacitor 25, in sequence, and outputs the control timing information which represents selected the mirror surfaces to the frequency divider circuit 34. A measuring unit 62 supplements the charge pump capacitor 25 with charge at a time when the optical beam deflected by the selected mirror surface is detected by the BD sensor 07 and determines the magnification of each of the mirror surfaces. That is, the measuring unit 62 measures the time difference between the BD signal from the BD sensor 07 and the BD signal from the second BD sensor 51 as the magnification, where the BD signals concern the laser beam deflected by the selected mirror surface. A determination unit 63 compares variations in the magnification on the mirror surfaces using each mirror surface as a mirror surface subject to supplement charge in turn and determines the mirror surface subject to supplement charge which minimizes the variations to be the specific mirror surface.

For example, if the selection unit 61 selects the first surface as the mirror surface subject to supplement charge, the charge pump capacitor 25 is supplemented with charge when the optical beam deflected by the first surface is detected by the BD sensor 07. At that time, the measuring unit 62 measures magnification on each of the first to eighth mirror surfaces. Also, the measuring unit 62 or determination unit 63 may calculate variance or standard deviation as a measure of variations in magnification. When measurements are finished using the first surface as the mirror surface subject to supplement charge, the selection unit 61 selects the second mirror surface. Next, the measuring unit 62 measures magnification on each of the first to eighth mirror surfaces. Furthermore, the measuring unit 62 or determination unit 63 calculates variance or standard deviation as a measure of variations in magnification. The measurement process described above is repeated for the first to eighth mirror surfaces, and consequently variations in magnification are determined using all the mirror surfaces in turn as the mirror surface subject to supplement charge. The determination unit 63 compares variations in the magnification among the mirror surface subject to supplement charges and stores identification information about the mirror surface subject to supplement charge which minimizes the variations, in the control timing storage unit 33 as the control timing information.

As described above, according to the present embodiment, the timing of giving an acceleration/deceleration command to the polygonal motor 09 is determined in such a way as to minimize variations in the magnification of the laser beam. Incidentally, although the present embodiment reduces fluctuations in the scanning magnification of the laser beam by controlling the phase of the BD signal when the BD signal is frequency-divided, the present invention is not necessarily limited to such a configuration, and the present invention is also applicable to a configuration in which the timing of giving an acceleration/deceleration command is controlled directly.

For example, as shown in FIG. 2A, the reference mark 40 which has a shape of an open-ended ring is formed on the top face of the rotating polygonal mirror 03. The part between the open ends is reflectively different from that of the remaining part of the reference mark 40. The optical sensor 41 detects the period of the part between the open ends and the rotational speed of the polygonal mirror is detected based on the detected period. If the rotational speed of the polygonal mirror does not coincide with a predetermined value, the polygonal motor control unit 30 gives an acceleration/deceleration command to the polygonal motor 09. The acceleration/deceleration command is given when the optical sensor 41 detects the part between the open ends of the reference mark 40. The acceleration/deceleration command is set so as to minimize the variations in the scanning magnification of the laser beam. That is, the open ends of the open-ended ring are set at such a position as to allow an acceleration/deceleration command to be given with timing which minimizes the variations in the scanning magnification of the laser beam on the multiple reflecting surfaces of the polygonal mirror.

Furthermore, since the present invention is intended to enable high-quality image formation by reducing the variations in the scanning magnification of the laser beam, the present invention can be implemented properly if the polygonal motor's speed control described so far is performed when an image is written. The polygonal motor's speed control does not need to be performed when no image is written, such as during acceleration immediately after the polygonal motor starts to rotate.

In this embodiment, the control unit controls the rotational speed of the polygonal motor on the basis of the period of the BD signal. As other method to control the rotational speed of the polygonal motor, the control unit may control the rotational speed on the basis of the rotational period of the open-ended position of the open-ended ring formed on the top face of the rotating polygonal mirror 03.

Second Embodiment

Figure 11:
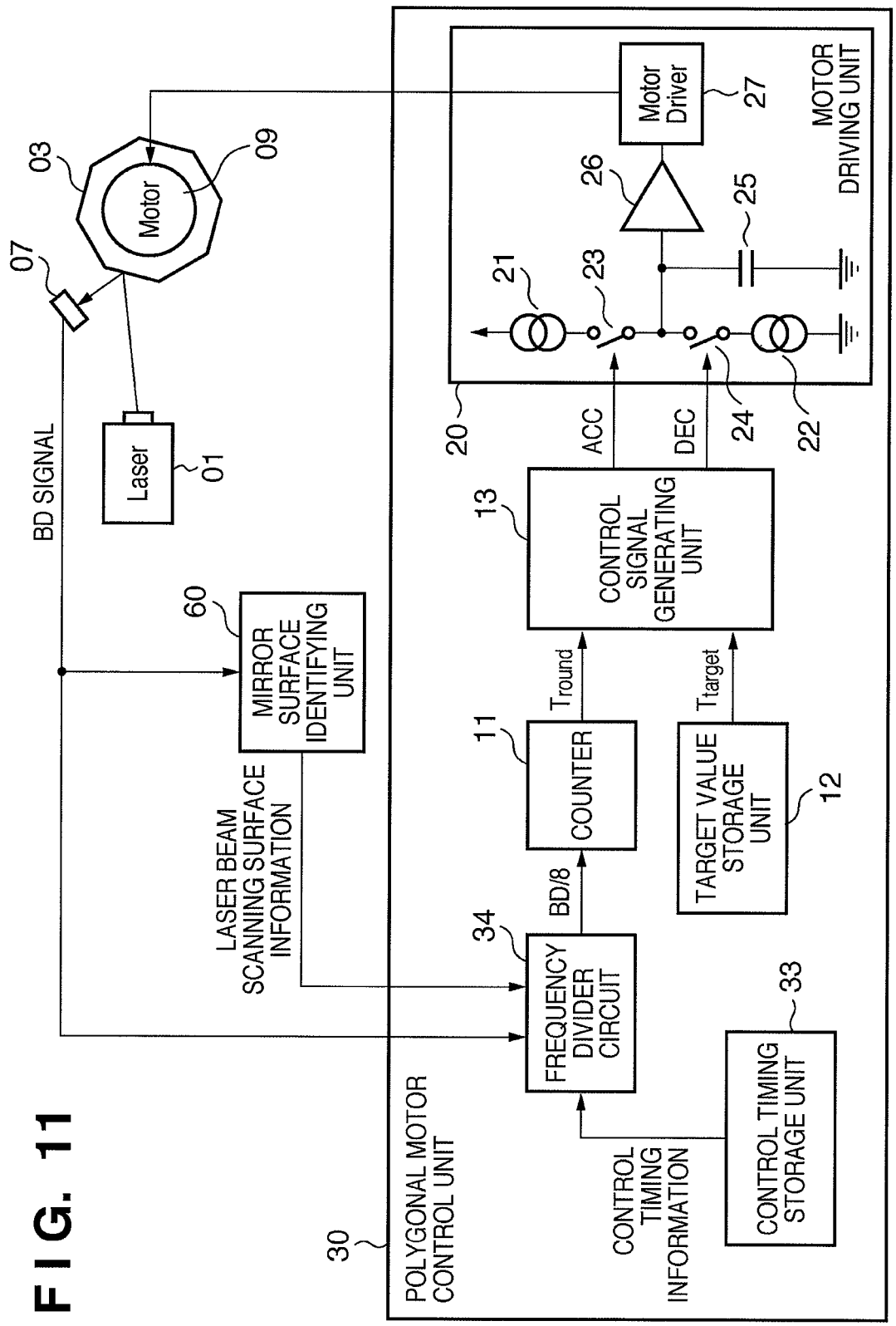
FIG. 11 is a block diagram of a polygonal motor control circuit according to a second embodiment.

FIG. 11 is a block diagram of a polygonal motor control circuit according to a second embodiment. The same components as those in the first embodiment will be denoted by the same reference numerals as the corresponding components in the first embodiment, and detailed description thereof will be omitted.

As described above, according to the first embodiment, mirror surfaces are identified using the reference mark detection signal output by the reference mark detection unit 31. The second embodiment does not include the reference mark detection unit 31, and a mirror surface identifying unit 60 identifies mirror surfaces using the BD signal.

Figure 12:
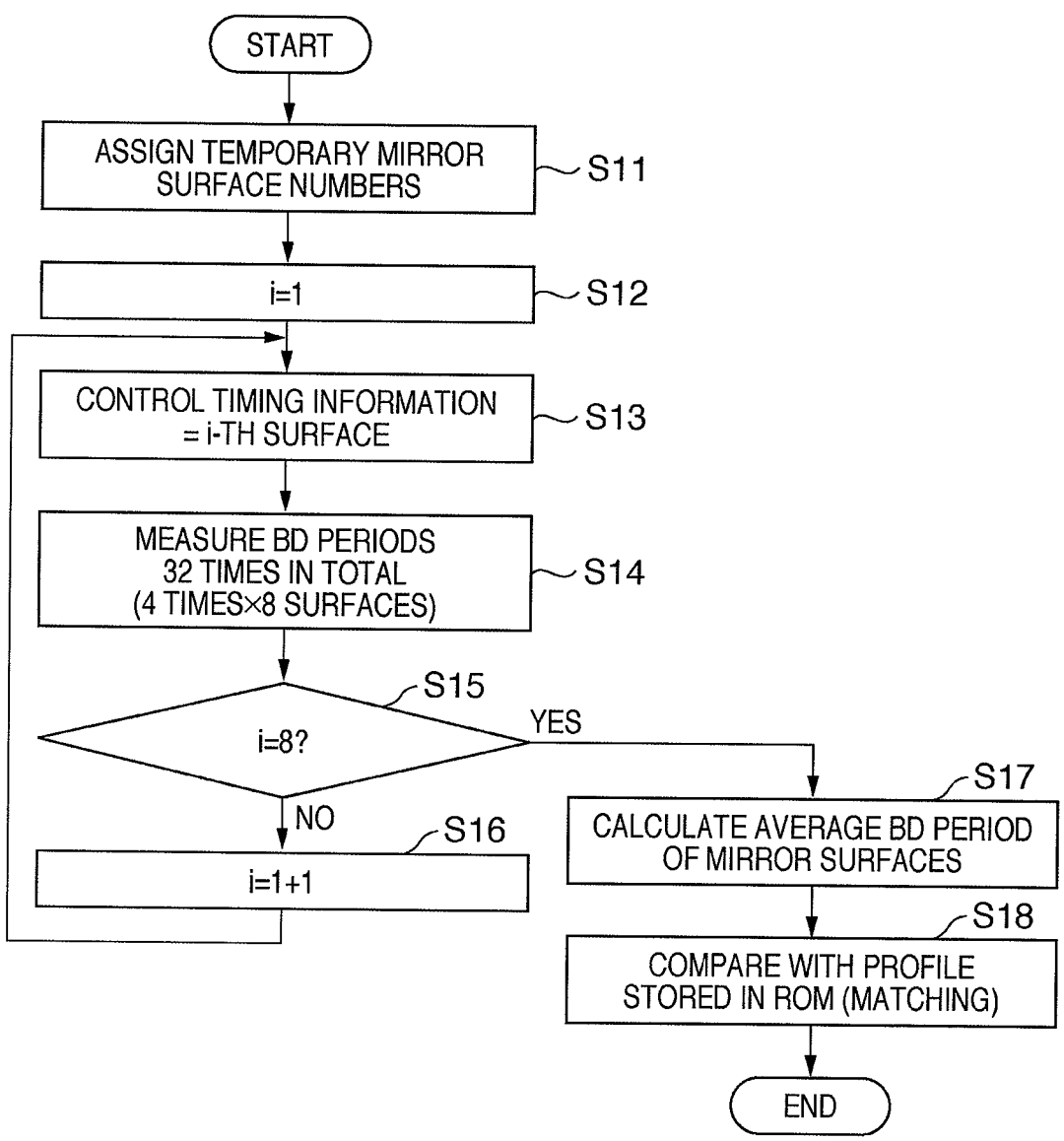
FIG. 12 is a flowchart illustrating operation of a mirror surface identifying unit 60.

FIG. 12 is a flowchart illustrating operation of the mirror surface identifying unit 60. It is assumed that a mirror surface identifying operation is started when the polygonal motor is rotating.

In step S11, the mirror surface identifying unit 60 assigns a temporary mirror surface number to each mirror surface. Since the number of mirror surfaces of the rotating polygonal mirror 03 is known, a temporary mirror surface number is assigned in order each time the BD signal is input.

In step S12, the mirror surface identifying unit 60 assigns "1" to variable i. The variable i represents a mirror surface number. In step S13, the mirror surface identifying unit 60 sets the i-th surface (the first surface because the first value of i is 1) in the control timing information described in the first embodiment. Consequently, rotation control of the polygonal motor 09 is performed.

In step S14, the mirror surface identifying unit 60 measures the BD period. In order to eliminate the effects of rotational jitter and the like of the polygonal motor 09, the BD period is measured multiple times and an average value is used as the measured value. In this case, the BD period of each mirror surface is measured four times for a total of 32 times and measurement results are stored in memory (where the BD period is the interval between the time when the laser beam deflected by the temporary first surface is detected and the time when the laser beam deflected by the temporary second surface is detected and the interval is calculated for the first mirror surface through to the eighth mirror surface).

In step S15, the mirror surface identifying unit 60 compares the value of the variable i with "8" (=the number of mirror surfaces) to determine whether or not all measurements have been completed. If the value of the variable i is not equal to "8," the mirror surface identifying unit 60 goes to step S16. In step S16, the mirror surface identifying unit 60 increments the variable i by 1. Subsequently, the mirror surface identifying unit 60 repeats steps S13 to S16. In this way, the mirror surface identifying unit 60 repeats the measurements in step S14 eight times in total (i.e., the number of mirror surfaces) by changing the control timings one by one from the temporary first surface to the temporary eighth surface.

If it is determined in step S15 that the value of the variable i is equal to "8," the mirror surface identifying unit 60 goes to step S17. In step S17, the mirror surface identifying unit 60 calculates an average of measured BD periods of the mirror surfaces (4 measurements×8 surfaces=32 measurements).

As described above, due to manufacturing errors and the like, not all of the mirror surfaces of the rotating polygonal mirror 03 are identical, and there are variations in the BD period. According to the second embodiment, variations in the BD period are measured and stored in a non-volatile memory during manufacture of the laser beam scanning apparatus.

In step S18, the mirror surface identifying unit 60 compares (matching) the average BD period of the mirror surfaces calculated in step S17 with the variations in the BD period (profile) stored in the non-volatile memory and thereby identifies the mirror surfaces. For example, if the BD period of the temporary first surface coincides with the BD period of the actual fourth surface, then it follows that the temporary second surface corresponds to the actual fifth surface. In this way, the mirror surface number of each mirror surface is identified.

As described above, according to the second embodiment, the mirror surfaces are identified through measurements of the BD periods. Compared to the first embodiment, the second embodiment has the advantage of being able to eliminate the reference mark detection unit 31.

Third Embodiment

Figure 13:
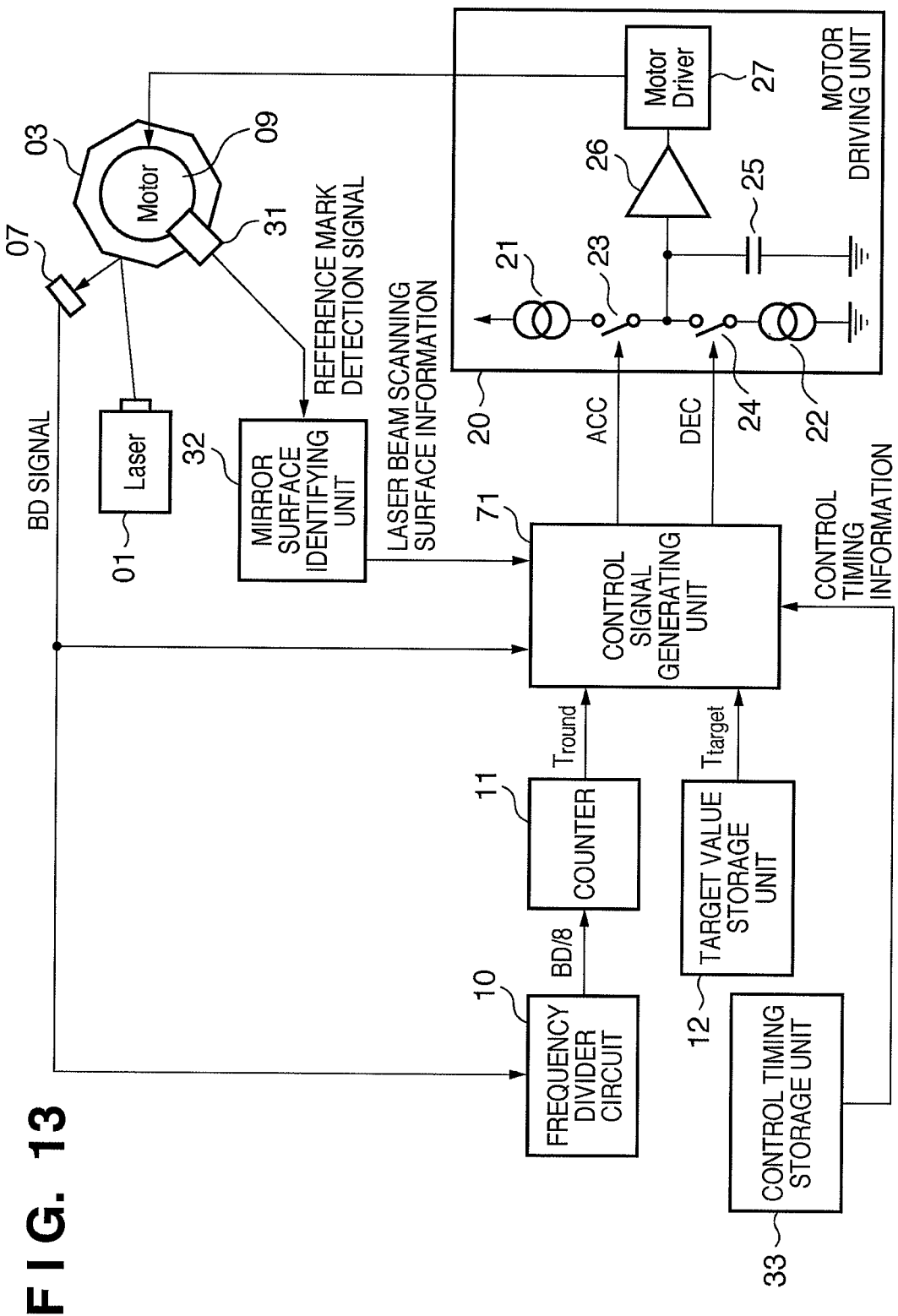
FIG. 13 is a block diagram of a polygonal motor control circuit according to a third embodiment.

FIG. 13 is a block diagram of a polygonal motor control circuit according to a third embodiment. The same components as those in the above embodiments will be denoted by the same reference numerals as the corresponding components in the above embodiments, and detailed description thereof will be omitted.

As shown in FIG. 13, the BD signal, which is a main scanning synchronization signal, is input to the frequency divider circuit 10. The frequency divider circuit 10 frequency-divides the BD signal by the number of mirror surfaces of the rotating polygonal mirror 03. The period of the resulting BD signal (BD/8 signal) is measured by the counter 11.

The period of the BD/8 signal measured in this way and the target period (Ttarget) stored in the target value storage unit 12 are input to a control signal generating unit 71. Also input to the control signal generating unit 71 are the BD signal, laser beam scanning surface information, and control timing information, which has been stored in the control timing storage unit 70. The laser beam scanning surface information is generated as a signal in the mirror surface identifying unit 32 as in the case of the first embodiment. According to the third embodiment, the control timing information stored in the control timing storage unit 70 includes two or more mirror surface numbers and control weighing information for each of the mirror surface numbers. The control weighing information indicates a weight to be applied to the pulse width (amount of control) of the ACC signal or DEC signal. In this way, the control timing information includes information which indicates that the drive unit should be accelerated or decelerated at a time when the optical beam deflected by a specific mirror surface out of multiple mirror surfaces is detected by the detection unit. Furthermore, the control timing information includes information which, being determined based on the scanning characteristics of the optical beam on the mirror surface, indicates a weight to be used in determining the amount of acceleration or deceleration of the drive unit at a given time. The five signals are input to the control signal generating unit 71. Next, the control signal generating unit 71 generates the ACC signal or DEC signal, both of which are control signals for the polygonal motor 09.

Figure 14:
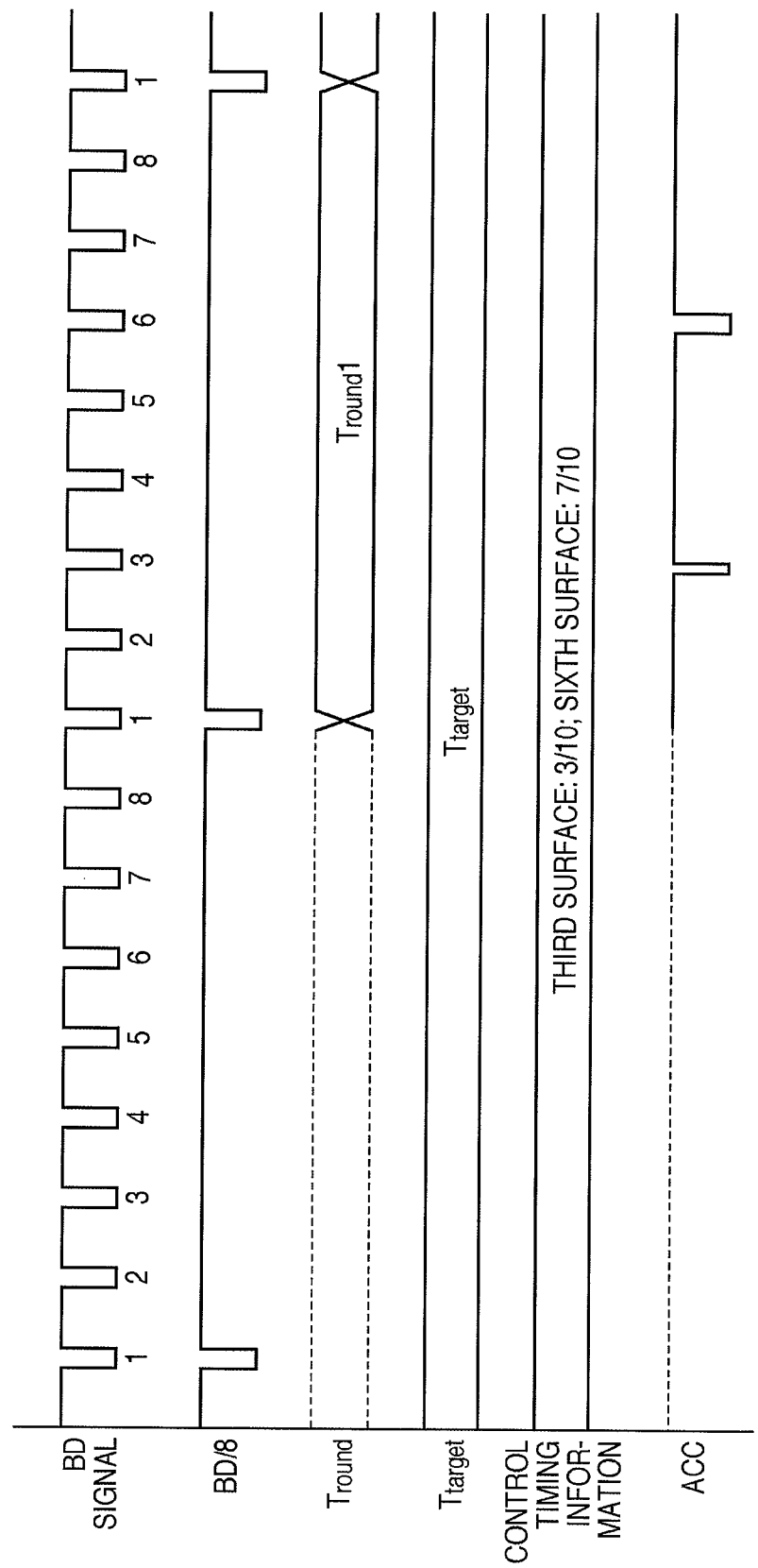
FIG. 14 is a timing chart illustrating operation of a control signal generating unit 71.

FIG. 14 is a timing chart illustrating operation of the control signal generating unit 71. In the example shown in FIG. 14, the BD signal resulting from detection of the laser beam deflected by the first surface of the rotating polygonal mirror 03 is output as a BD/8 signal. The interval between the first falling edge and second falling edge of the BD/8 signal is measured by the counter 11 shown in FIG. 13 and the period Tround determined as a result is input to the control signal generating unit 71. The target period Ttarget is received from the target value storage unit 12.

The control timing information is received from the control timing storage unit 70. Specifically, the control timing information includes two or more mirror surface numbers and control weighing information for each of the mirror surface numbers, as described above. In the example shown in FIG. 14, the control timing information contains two mirror surface numbers of the third and sixth surfaces and control weighing information, $3/10$ and $7/10$, for the two mirror surfaces.

When the measured period Tround of the BD/8 signal is input, the control signal generating unit 71 calculates the pulse width of the ACC signal or DEC signal to be output, using Tround and Ttarget. The pulse width can be calculated in the same manner as in the first embodiment. For example, it is assumed here that a result of the calculation is such that the ACC signal is to be output for just 200 nsec (nano-seconds).

The control signal generating unit 71 generates and outputs the ACC signal or DEC signal based on the calculation result of the pulse width and input control timing information. Since the control timing information contains "third surface: $3/10$" and "sixth surface: $7/10$," immediately after the laser beam deflected by the third surface is detected by the BD sensor, the control signal generating unit 71 outputs the ACC signal for just 60 nsec, which is 3/10 the calculated pulse width of 200 nsec. Similarly, immediately after the laser beam deflected by the sixth surface is detected by the BD sensor, the control signal generating unit 71 outputs the ACC signal for just 140 nsec, which is 7/10 the calculated pulse width of 200 nsec. The speed control of the polygonal motor is performed through repetition of the above-described operation.

As described above, a feature of the third embodiment is that it reduces fluctuations in magnification by supplementing the charge two or more times per rotation of the polygonal motor and by controlling the timing and weighting of the supplementation. The timing and weighting depend on variations in the geometry of the rotating polygonal mirror and may be determined based on measurement results during manufacture or calculated by a measuring mechanism (such as described above) built into the laser beam scanning apparatus, as in the case of the first embodiment.

According to the third embodiment, mirror surfaces are identified in the same manner as in the first embodiment, but may be identified in the same manner as in the second embodiment.

Three embodiments have been described above, but the present invention is not limited to them. For example, although in the three embodiments, measurements are taken using the BD period determined by frequency-dividing the BD signal by the number of mirror surfaces of the rotating polygonal mirror, measurements may be taken in shorter periods by taking into consideration the fluctuations in the BD period. Even in that case, the fluctuations in the scanning magnification of the laser beam can be reduced by giving an acceleration/deceleration command to the polygonal motor with the timing determined from variations in the geometry of the rotating polygonal mirror.

Also, although an eight-faced rotating polygonal mirror is used in the three embodiments, it goes without saying that the present invention is not limited to this.

Furthermore, although the three embodiments are configured such that the motor driver rotates the motor in proportion to the voltage of the charge pump capacitor, the relationship between the voltage and rotational speed may be inversely proportional. That is, the motor may be rotated faster with decreases in the voltage of the charge pump capacitor. In that case, when the polygonal motor is rotating at around its target speed, the signal output periodically to supplement the charge is the DEC signal rather than the ACC signal. Incidentally, speed fluctuations caused by the periodic output of the DEC signal are different from those of the ACC signal, and so is the optimum control timing. In any case, a feature of the present invention is to control the timing of giving an acceleration/deceleration command to the polygonal motor and thereby reduce the fluctuations in the scanning magnification of the laser beam.

Needless to say, the optical scanning apparatus described above can be applied to an electrophotographic image forming apparatus. Such an image forming apparatus generally includes an image carrier such as a photosensitive drum, an electrostatic charger which charges the image carrier, and an optical scanning apparatus which deflection-scans the image carrier with an optical beam corresponding to image data. Furthermore, the image forming apparatus includes a developing apparatus which develops a latent image formed on the image carrier, a transfer apparatus which transfers a toner image formed on the image carrier to a recording medium, and a fixing apparatus which fixes the toner image to the recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-149761, filed Jun. 6, 2008, which is hereby incorporated by reference herein in its entirety.

What is claimed is:

1. An optical scanning apparatus comprising:
a light source which emits an optical beam;
a deflection unit including a rotating polygonal mirror which, having a plurality of reflecting surfaces, deflects the optical beam emitted from the light source so that the optical beam scans an object to be scanned, and a drive unit configured to drive the rotating polygonal mirror;
an output unit configured to output a specific surface signal indicative of a specific one of the plurality of reflecting surfaces of the rotating polygonal mirror while the rotating polygonal mirror is rotating;
a speed detection unit configured to detect rotational speed of the rotating polygonal mirror;
a control unit configured to control the drive unit to perform acceleration or deceleration of the rotating polygonal mirror at a timing associated with the specific surface signal outputted by the output unit, based on a detection result of the speed detection unit,
wherein the timing corresponds to a timing when the specific surface is deflecting the optical beam, and the specific surface is a surface such that deviation of length of a scanning line corresponding to the specific surface is relatively smaller as compared to that of others of the plurality of reflecting surfaces.

2. The optical scanning apparatus according to claim 1, wherein the output unit includes a reference position detection unit which detects a reference position provided on the rotating polygonal mirror,
wherein the control unit controls the drive unit to perform acceleration or deceleration of the rotating polygonal mirror at a timing based on the reference position detected by the reference position detection unit.

3. The optical scanning apparatus according to claim 2, wherein the speed detection unit includes an optical beam detection unit which detects the optical beam deflected by the rotating polygonal mirror, and
wherein the control unit controls the drive unit to perform acceleration or deceleration of the rotating polygonal mirror at a timing based on the reference position detected by the reference position detection unit, and based on a detection result of the optical beam detection unit.

4. The optical scanning apparatus according to claim 3, further comprising:
a frequency-dividing unit which divides, by the number of reflecting surfaces of the rotating polygonal mirror, a signal output from the optical beam detection unit by detecting the optical beam deflected by the plurality of reflecting surfaces of the rotating polygonal mirror,
wherein the control unit controls the drive unit to perform acceleration or deceleration of the rotational polygonal mirror so that the frequency of the signal frequency-divided by the frequency-dividing unit will equal a predetermined frequency.

5. The optical scanning apparatus according to claim 1, further comprising:
a capacitor used to accelerate or decelerate the rotational speed of the drive unit; and a charge/discharge unit which supplements the capacitor with charge to accelerate the drive unit and discharges the capacitor to decelerate the drive unit, wherein the control unit supplements the capacitor with charge or discharges the capacitor at the timing.

6. The optical scanning apparatus according to claim 1, further comprising a storing unit which stores timing information indicative of the specific surface, wherein the control unit controls the drive unit based on the stored timing information and based on the detection results of the speed detection unit.

7. An optical scanning apparatus comprising:
a light source which emits an optical beam;
a deflection unit including a rotating polygonal mirror which, having a plurality of reflecting surfaces, deflects the optical beam emitted from the light source so that the optical beam scans a photosensitive member, and a drive unit which drives the rotating polygonal mirror;
an output unit which outputs a control signal according to rotation of the rotating polygonal mirror while the rotating polygonal mirror is rotating;
a speed detection unit which detects rotational speed of the rotating polygonal mirror;
a storing unit which stores timing information indicating a specific timing for starting a change of rotational speed of the rotating polygonal mirror during one rotation of the rotating polygonal mirror; and
a control unit configured to change the rotational speed of the rotating polygonal mirror to approach a target rotational speed if the rotational speed of the rotating polygonal mirror detected by the speed detection unit is different from the target rotational speed,
wherein the control unit starts a change in the rotational speed of the rotating polygonal mirror at a timing corresponding to the specific timing stored in the storing unit, and
wherein with respect to a deviation of length of the latent image formed on the photosensitive member in a scanning direction of the optical beam deflected by the plurality of reflecting surfaces of the rotating polygonal mirror while the rotational speed is changing, the specific timing is a timing at which such deviation is reduced as compared to that of other timings different from the specific timing.

8. The optical scanning apparatus according to claim 7, wherein the specific timing stored in the storing unit is a timing when a specific surface of the rotating polygonal mirror is deflecting the optical beam, and the specific surface is a surface such that deviation of length of the latent image corresponding to the specific surface is relatively smaller as compared to others of the plurality of reflecting surfaces.

9. The optical scanning apparatus according to claim 8, wherein the control unit controls the drive unit based on the specific surface stored in the storing unit and based on the detection results of the speed detection unit.

10. The optical scanning apparatus according to claim 7, wherein the output unit includes a reference position detection unit which detects a reference position provided on the rotating polygonal mirror,
wherein the control unit controls to start change of the rotational speed of the rotating polygonal mirror at a timing based on the reference position detected by the reference position detection unit.

11. The optical scanning apparatus according to claim 10, wherein the speed detection unit includes an optical beam detection unit which detects the optical beam deflected by the rotating polygonal mirror, and
wherein the control unit controls to start change of the rotational speed of the rotating polygonal mirror at a timing based on the reference position detected by the reference position detection unit, and based on a detection result of the optical beam detection unit.

12. The optical scanning apparatus according to claim 11, further comprising:
a frequency-dividing unit which divides, by the number of reflecting surfaces of the rotating polygonal mirror, a signal output from the optical beam detection unit by detecting the optical beam deflected by the plurality of reflecting surfaces of the rotating polygonal mirror,
wherein the control unit controls to start change of the rotational speed of the rotating polygonal mirror so that the frequency of the signal frequency-divided by the frequency-dividing unit will equal a predetermined frequency.

13. The optical scanning apparatus according to claim 7, further comprising:
a capacitor used to accelerate or decelerate the rotational speed of the drive unit; and
a charge/discharge unit which supplements the capacitor with charge to accelerate the drive unit and discharges the capacitor to decelerate the drive unit,
wherein the control unit supplements the capacitor with charge or discharges the capacitor at the specific timing.

* * * * *